United States Patent [19]

Bennett

[11] Patent Number: 4,741,473

[45] Date of Patent: May 3, 1988

[54] EXPANDABLE STRUCTURE

[76] Inventor: Richard C. Bennett, 4 Court of Chapelwood, Northbrook, Ill. 60062

[21] Appl. No.: 838,456

[22] Filed: Mar. 11, 1986

[51] Int. Cl.[4] .................................. B23K 37/04
[52] U.S. Cl. .................. 228/49.3; 269/48.1; 279/2 R
[58] Field of Search .............. 228/49.3; 269/48.1; 29/281.5, 282; 279/2 R; 242/72 R, 72.1

[56] References Cited

U.S. PATENT DOCUMENTS

| | | | |
|---|---|---|---|
| 2,167,338 | 7/1939 | Murcell | 269/48.1 |
| 2,737,141 | 3/1956 | Mitchell | 269/48.1 |
| 2,780,194 | 2/1957 | Croswell | 228/49.3 |
| 2,804,836 | 9/1957 | Tiedemann | 269/48.1 |
| 2,821,946 | 2/1958 | Goekler | 269/48.1 X |
| 2,952,231 | 9/1960 | Chyle et al. | 228/50 |
| 3,085,763 | 4/1963 | Floyd, Jr. | 242/72.1 |
| 3,086,727 | 4/1963 | Tracy | 242/72.1 |
| 3,110,277 | 11/1963 | Dixon et al. | 228/50 |
| 3,460,736 | 8/1969 | Cadle et al. | 228/50 |
| 3,803,692 | 4/1974 | Herdman et al. | 29/282 X |
| 3,825,165 | 7/1974 | Howell | 228/50 |
| 3,837,061 | 9/1974 | Hirose et al. | 29/281.5 X |
| 3,979,041 | 9/1976 | Kaneyama et al. | 228/49.3 |
| 4,177,914 | 12/1979 | Calvin | 228/49.3 |

FOREIGN PATENT DOCUMENTS 334033   4/1972   U.S.S.R. ..................... 228/49.3

Primary Examiner—Kenneth J. Ramsey

[57] ABSTRACT

An expandable structure includes a hollow tubular frame having radially outwardly extending portions which define two longitudinally spaced-apart annular channels. Two segmented cylinders are respectively disposed in the channels, each cylinder comprising alternating long and short segments abutting along cam surfaces which lie in planes defining chords of the cylinders. Each long segment is biased inwardly by a spring which bears against the head of a stud which extends radially inwardly from the segment through a complementary opening in the frame. Pusher members are movable axially inside the frame for camming engagement with cam follower lugs which extend radially inwardly from the short segments through apertures in the frame. The pushers are slotted to accommodate the bias spring studs. Means is provided for rotating the frame about its axis.

20 Claims, 2 Drawing Sheets

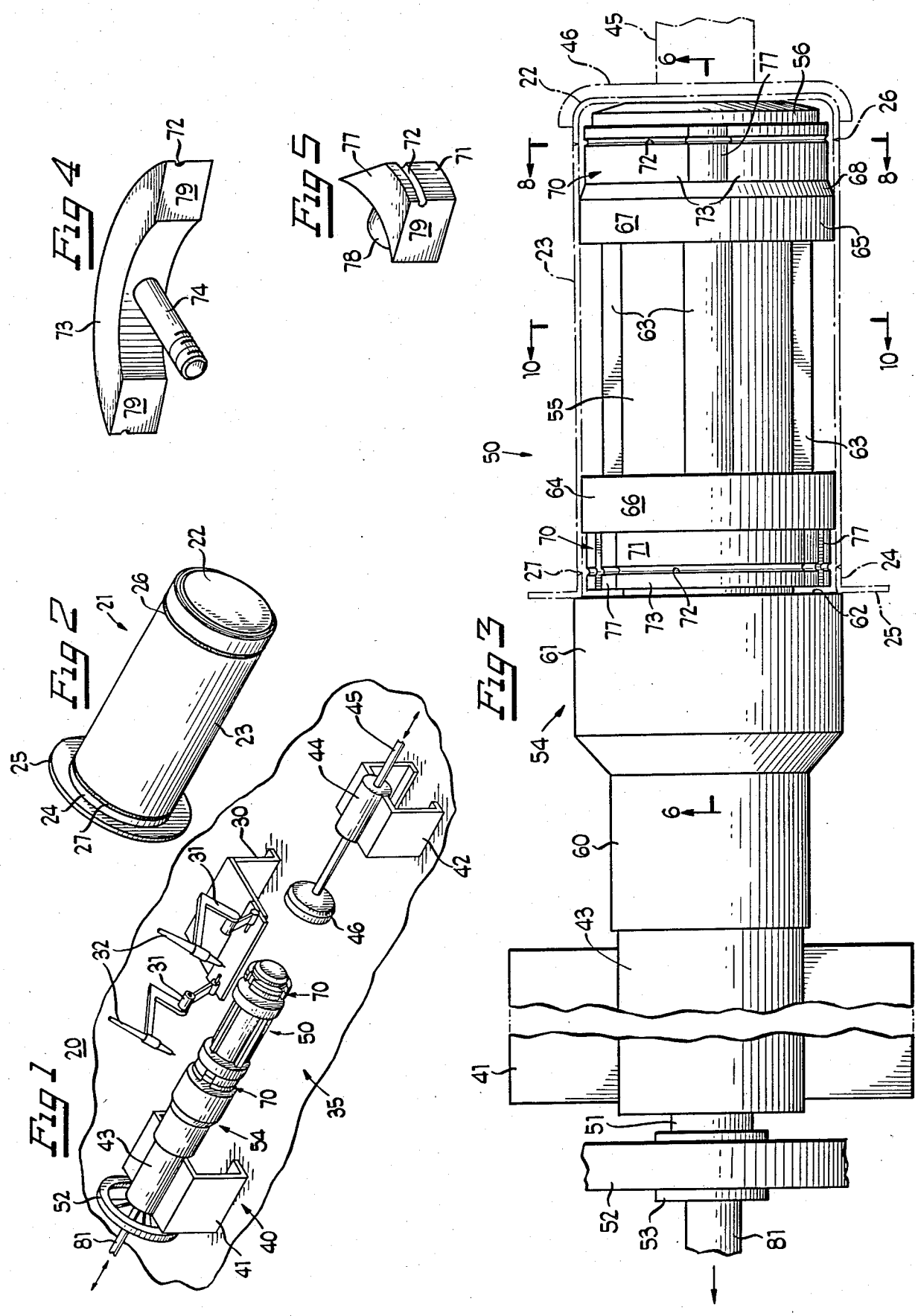

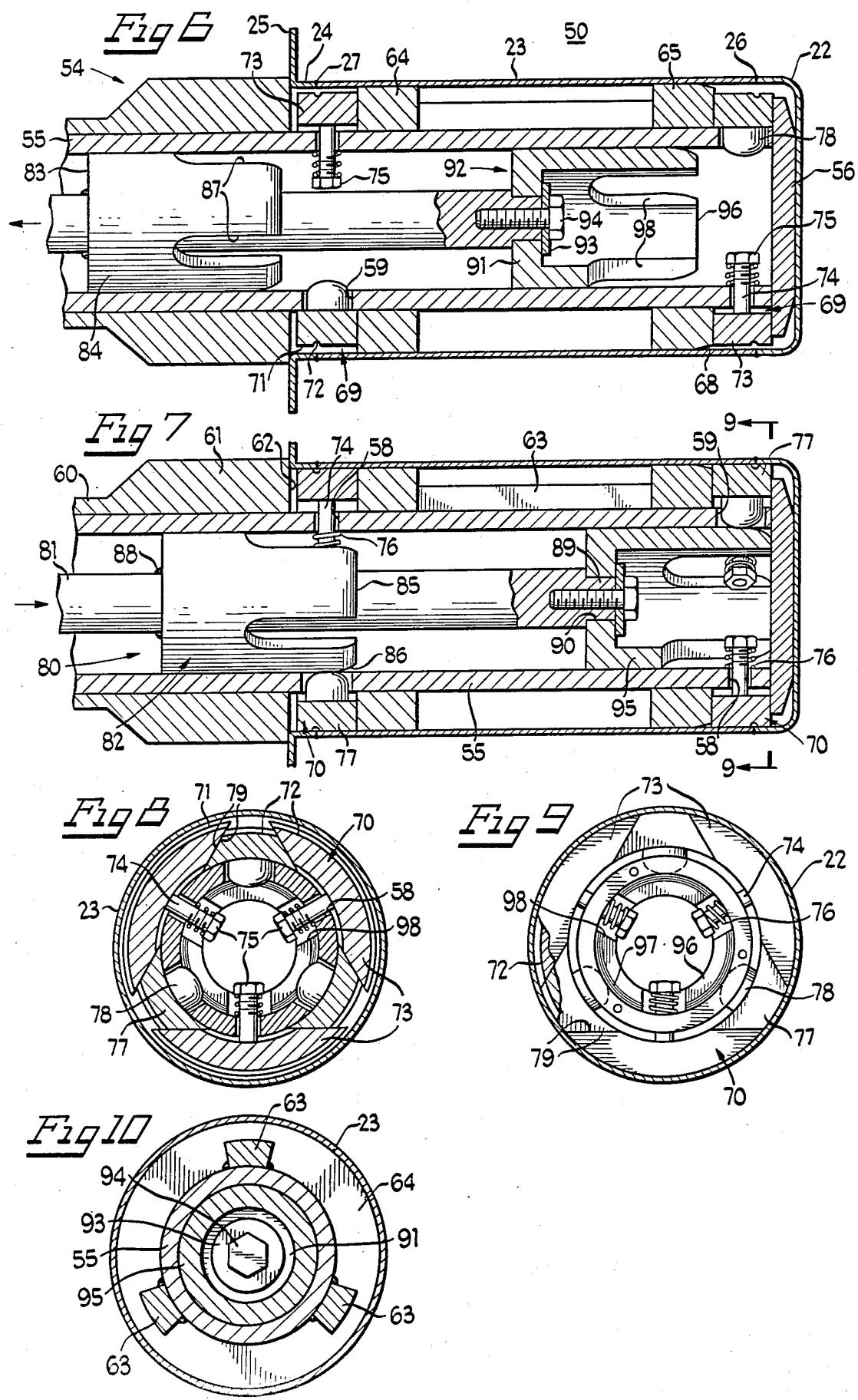

EXPANDABLE STRUCTURE

BACKGROUND OF THE INVENTION

The present invention relates to expandable cylindrical devices, and has particular application to expandable mandrels. Such mandrels may be used, for example, to clamp in position two cylindrical members for butt-welding them together.

Many prior expandable mandrel devices have utilized circumferentially segmented apparatus which is characterized by gaps between the segments in the expanded condition. These gaps are disadvantageous, particularly in welding applications.

Segmented expandable mandrels have been provided which afford a substantially continuous cylindrical surface in the expanded condition, but such mandrels have typically been characterized by a large number of segments, each of which must be separately driven, resulting in an expensive and complex construction.

Furthermore, heretofore expandable mandrels of the type utilized for welding applications have been specifically adapted for use with tubular members, such as pipe sections, which remain fixed during the welding operation. Accordingly, these mandrels have not been suitable for use with workpieces which must be rotated during the welding operation.

SUMMARY OF THE INVENTION

It is a general object of the present invention to provide an improved expandable cylinder apparatus which avoids the disadvantages of prior apparatus while affording additional structural and operating advantages.

An important object of the invention is the provision of an expandable cylinder which comprises a plurality of segments, only certain ones of which are directly driven during the expansion operation.

In connection with the foregoing object, it is another object of this invention to provide an expandable cylinder of the type set forth, which is of relatively simple and economical construction.

In connection with the foregoing objects, yet another object of the invention is the provision of an expandable cylinder of the type set forth, wherein adjacent segments are disposed in camming engagement with each other so that movement of only certain segments will result in a corresponding movement of adjacent segments.

Still another object of the invention is the provision of an expandable mandrel of the type set forth, which is rotatable along its longitudinal axis to permit rotation of a workpiece mounted thereon.

These and other objects of the invention are attained by providing an expandable structure comprising a frame, a segmented cylinder carried by the frame and including a plurality of discrete segments each having a part-cylindrical outer surface, each of the segments being movable inwardly and outwardly of said cylinder between an expanded condition wherein the outer surfaces cooperate to form a substantially continuous cylindrical surface and a retracted condition, bias means resiliently urging first ones of the segments inwardly to the retracted condition thereof, drive means movable axially of said ring for moving second ones of the segments outwardly to the expanded condition thereof, and means responsive to movement of either of the first or second ones of the segments for effecting a corresponding movement of the other ones of the segments.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a welding system incorporating a segmented-ring expandable mandrel constructed in accordance with and embodying the features of the present invention;

FIG. 2 is an enlarged perspective view of a workpiece to be welded by use of the welding system of FIG. 1;

FIG. 3 is an enlarged fragmentary side elevational view of the expandable mandrel of FIG. 1, illustrating the positioning of a workpiece thereon and showing the mandrel in its retracted condition;

FIG. 4 is a further enlarged perspective view of one of the segments of the segmented rings of the expandable mandrel of FIG. 3;

FIG. 5 is a perspective view of another one of the segments of a segmented ring of the expandable mandrel of FIG. 3;

FIG. 6 is a view in horizontal section taken along the line 6—6 in FIG. 3;

FIG. 7 is a view similar to FIG. 6, but illustrating the expandable mandrel in its expanded condition;

FIG. 8 is a view in vertical section taken along the line 8—8 in FIG. 3;

FIG. 9 is a view in vertical section taken along the line 9—9 in FIG. 7, with portions of the segmented ring broken away; and FIG. 10 is a view in vertical section taken along the line 10—10 in FIG. 3.

DESCRIPTION OF THE PREFERRED EMBODIMENT

Referring to FIGS. 1 and 2, there is illustrated a welding system, generally designated by the numeral 20, incorporating an expandable mandrel 50 constructed in accordance with and embodying the features of the present invention. The welding system 20 is designed for welding a particular workpiece 21, which is the water reservoir of an appliance and includes a cup-shaped end portion 22, an elongated cylindrical center portion 23 and a short cylindrical end portion 24 provided with a radially outwardly extending annular flange 25. More specifically, the welding system 20 is utilized for butt-welding the center portion 23 to the end portions 22 and 24, respectively along seams 26 and 27, in a known manner. It will be appreciated that the workpiece 21 is shown simply for purposes of illustration, and that the principles of the present invention could be used for welding other types of workpieces.

The welding system 20 includes a welding platform 30 on which is mounted a pair of articulated mounting arms 31, respectively supporting welding heads 32. Disposed adjacent to the welding platform 30 at a welding station 35 is a support assembly 40, which includes two spaced-apart base members 41 and 42, respectively carrying coaxial bearings 43 and 44. An elongated shaft 45 is journaled in the bearing 44 for rotational and axial movement with respect thereto, the shaft 45 being provided at its inner end with a generally cup-shaped retainer 46.

The expandable mandrel 50 is carried by the base member 41, and includes a hollow cylindrical shaft 51 (FIG. 3) journaled in the bearing 43 for rotational movement. A drive wheel 52 has a hub 53 fixedly secured to the shaft 51, and may be coupled by a suitable drive train (not shown) to associated motive means for effecting rotation of the shaft 51 about its longitudinal axis.

Referring now also to FIGS. 3-10, there is mounted on the shaft 51 a frame 54, which includes an elongated hollow circular cylinder 55, fixedly secured at one end thereof to the shaft 51 in coaxial surrounding relationship therewith. The other end of the cylinder 55 is closed by a circular end plate 56 which has a diameter greater than the outer diameter of the cylinder 55, as can best be seen in FIGS. 6 and 7. Formed in the cylinder 55 are two longitudinally spaced-apart circumferential rows of apertures, each row including three small circular apertures 58, alternating with three relatively large circular apertures 59, the apertures 58 and 59 being substantially equiangularly spaced-apart. Preferably, the apertures of one row are rotatably offset by about 60° with respect to the apertures of the other row, so that a small aperture 58 of one row is in longitudinal alignment with a large aperture 59 of the other row, and vice versa.

Surrounding and fixedly secured to the supported end of the cylinder 55 is a cylindrical sleeve 60 having a large-diameter portion 61 which terminates in an annular end face 62, the outer diameter of the portion 61 preferably being substantially greater than the diameter of the end plate 56. Fixedly secured to the outer surface of the cylinder 55 at equiangularly spaced-apart locations thereon are three longitudinally extending ribs 63, interconnected at their opposite ends by two annular blocks or rings 64 and 65, which respectively have cylindrical outer surfaces 66 and 67 (FIG. 3) of equal diameter, which is preferably slightly less than the outer diameter of the end face 62 of the sleeve 60. Each of the ribs 63 preferably has a part-cylindrical outer surface, the diameter of which is less than that of the surfaces 66 and 67. The surface 67 of the annular block 65 is beveled or chamfered at its outer edge, as at 68 (FIG. 6). It will be noted that the annular blocks 64 and 65 are respectively spaced longitudinally from the end face 62 and the end plate 56 and cooperate therewith and with the outer surface of the cylinder 55 to define two annular channels 69 (FIG. 6).

Respectively disposed in the channels 69 are two segmented rings or cylinders 70 which are of substantially the same construction, but are rotatably displaced about 60° with respect to each other. Each of the rings 70 has a cylindrical outer surface 71 (FIGS. 5 and 6) in which is formed a circumferential groove 72. Each of the rings 70 comprises six arcuate segments, including three long segments 73 alternating with three short segments 77. Each of the long segments 73 is provided centrally of its inner surface with an elongated stud 74 which extends radially inwardly through an aligned one of the small apertures 58 in the cylinder 55. Each of the studs 74 is preferably threaded at its inner end and threadedly receives thereon a nut 75 for cooperating with the inner surface of the cylinder 55 to trap therebetween a helical compression spring 76 which encircles the stud 74. It will be appreciated that each of the studs 74 is provided with a spring 76. Each of the short segments 77 is provided centrally of its inner surface with an integral lug or pin 78 which extends radially inwardly therefrom through an aligned one of the large apertures 59 in the cylinder 55. Preferably, the inner end of each of the lugs 78 is rounded and terminates a slight distance inwardly of the inner surface of the cylinder 55 (see FIGS. 3-8).

The segments 73 and 77 of each ring 70 result from dividing the ring 70 along parting planes which form chords of the ring 70 and are arranged as the sides of an equilateral triangle. Thus, the ends of each of the segments 73 and 77 define planar cam surfaces 79, along which the segments 73 abut the segments 77. The thickness of the ring 70 is such as to permit a limited radial movement of each of the segments 73 and 77 between a retracted condition, illustrated in FIGS. 5, 6 and 8 and an expanded condition, illustrated in FIGS. 7 and 9.

When a ring 70 is in its expanded condition, the outer surfaces of the segments 73 and 77 cooperate to define a substantially continuous outer surface 71 of the ring 70, which surface has a diameter substantially equal to the inner diameter of the workpiece 21, as will be explained more fully below. When a ring 70 is in its retracted condition, all of the segments 73 and 77 are moved radially inwardly from the expanded condition, the short segments 77 being disposed in contact with the outer surface of the cylinder 55 and with the long segments 73 spaced a slight distance from the cylinder 55 so that the outer surface 71 of the ring 70 is discontinuous, as is best illustrated in FIG. 8.

The expandable mandrel 50 also includes an actuator assembly 80 which includes an elongated rod 81 extending coaxially through the shaft 51 and the cylinder 55 and adapted for axial movement with respect thereto. Fixedly secured to the rod 81 at longitudinally spaced-apart locations thereon within the cylinder 55 are two pushers 82 and 92, best shown in FIGS. 6 and 7. The pusher 82 is spaced from the end of the rod 81 and is in the form of a generally cup-shaped structure having a circular end wall 83 and a cylindrical side wall 84, the rod 81 being received through a complementary opening centrally of the end wall 83 and secured thereto as by weldments 88. The side wall 84 terminates in an annular end surface 85 which is beveled or chamfered, as at 86. The side wall 84 is provided with three equiangularly spaced-apart slots 87 which extend longitudinally thereof from the end surface 85. The outer diameter of the side wall 84 is very slightly less than the inner diameter of the cylinder 55 to permit sliding movement of the pusher 82 within the cylinder 55, while at the same time serving to center the rod 81 in the cylinder 55.

The rod 81 is provided with a reduced-diameter tip 89 which is received through a complementary bore 90 (FIG. 7) in a circular end wall 91 of the pusher 92, which is similar in shape to the pusher 82. The tip 89 is internally threaded and is fixedly secured to the pusher 92 by a washer 93 and a threaded fastener 94. The pusher 92 is provided with a cylindrical side wall 95 terminating in an annular end surface 96 which is beveled or chamfered, as at 97 (FIG. 9). The side wall 95 has an outer diameter substantially the same as that of the pusher 82, and is provided with three equiangularly spaced-apart slots 98 extending longitudinally thereof from the end surface 96.

The operation of the welding system 20 and the expandable mandrel 50 will now be explained. Initially, the rings 70 of the expandable mandrel 50 are in their retracted conditions, with the parts disposed as illustrated in FIGS. 5 and 8. In this regard, it will be appreciated that the compression springs 76 resiliently urge the long segments 73 of the rings 70 radially inwardly to their retracted condition. Because of the engagement of the long segments 73 with the short segments 77 along the cam surfaces 79, this radially inward movement of the long segments 73 serves to effect, by cam action, a radially inward movement of the short segments 77.

The portions 22-24 of the workpiece 21 are assembled on the expandable mandrel 50 by sliding over the distal end thereof, this assembly being facilitated by the bevel 68 on the annular block 65. The inner cylindrical surfaces of the workpiece 21 are disposed in sliding engagement with the cylindrical outer surfaces 66 and 67 of the annular blocks 64 and 65, but are spaced from the outer surfaces 71 of the retracted segmented rings 70. More specifically, the portions 22-24 are arranged in end-to-end abutting relationship, with the flange 25 of the end portion 24 abutting the end face 62, and with the end portion 22 abutting the end plate 56, as indicated in broken line in FIG. 5 and in solid line in FIG. 6. When thus assembled, the seams 26 and 27 will respectively be disposed in radial alignment with the grooves 72 of the segmented rings 70. When the workpiece 21 has been thus mounted on the expandable mandrel 50, the shaft 45 is moved axially to the left, as viewed in FIG. 1, until the cup-shaped retainer 46 bears against the cup-shaped end portion 22 of the workpiece 21, as indicated in FIG. 3, and is then locked axially in position by suitable means (not shown).

Then, the segmented rings 70 of the expandable mandrel 50 are moved to their expanded conditions. More specifically, the rod 81 is moved axially to the right, as viewed in FIG. 1, thereby to move the pushers 82 and 92 from the position illustrated in FIGS. 6 and 8 to that illustrated in FIGS. 7 and 9, the studs 74 being respectively received in the slots 87 and 98 to accommodate this axial movement. During this axial movement, the cylindrical side walls 84 and 95 of the pushers 82 and 92 will cam past the lugs 78 of the short ring segments 77, this camming action being facilitated by the rounded ends of the lugs 78 and the beveled portions 86 and 97 of the pushers 82 and 92. This camming action will drive the short ring segments 77 radially outwardly to their expanded conditions, illustrated in FIGS. 7 and 9.

Because of the engagement of the short segments 77 with the long segments 73 along the cam surfaces 79, this outward movement of the short segments 77 will, by cam action, drive the long segments 73 radially outwardly to their expanded condition. When the segmented rings 70 are disposed in their expanded conditions, they will firmly engage the inner cylindrical surfaces of the workpiece portions 22-24, with the grooves 72 disposed immediately inside the seams 26 and 27, thereby securely to frictionally hold the workpiece 21 on the expandable mandrel 50 for rotation therewith. The expanded rings 70 will provide a firm backing as well as heat sinks for the seam welds.

The welding heads 32 are disposed so that they are respectively directly opposite the seams 26 and 27. These heads 32 are then pivoted over to their work position for welding the workpiece portions 22-24 together, respectively along the seams 26 and 27, all in a known manner. More specifically, the expandable mandrel 50 and the workpiece 21 carried thereby, are rotated by rotation of the shaft 51, so that the entire circumferential extent of the seams 26 and 27 moves past the fixed welding heads 32, thereby to weld the workpiece 21 around its entire circumference. It will be appreciated that the bearing 44 permits rotation of the shaft 45 and the retainer 46 with the rotating workpiece 21. The circumferential grooves 72 permit the formation of internal beads along the welded seams 26 and 27. More specifically, the molten weld metal will flow into the grooves 72 to form a very slight internal bead at the weld to assure that the seams 26 and 27 are efficiently welded through the entire thickness of the workpiece 21.

When the seams 26 and 27 have been completely welded, the welding heads 32 are pivoted back to their retracted positions, and the retainer 46 is retracted by moving the shaft 45 axially to the right, as viewed in FIG. 1. Then, the segmented rings 70 of the expandable mandrel 50, are moved to their retracted positions, by moving the rod 81 axially to the left, as viewed in FIGS. 1 and 6. As the ends of the pushers 82 and 92 clear the lugs 78, the ring segments 73 and 77 will be moved back to their retracted conditions under the urging of the bias springs 76. The completely welded workpiece 21 may then be slid axially off the end of the expandable mandrel 50, and a new workpiece mounted in place.

While the expandable mandrel 50 of the present invention has been disclosed as a circularly cylindrical structure, it is within the compass of the present invention that the mandrel 50, and in particular the cylinders 70 thereof may have other cylindrical shapes, including squares or rectangles. Furthermore, while the present invention has disclosed a mechanical camming cooperation between the actuator assembly 80 and the segmented rings or cylinders 70, the invention also contemplates that the segmented rings or cylinders 70 could also be expanded by other means, such as hydraulic means or the like.

While the present invention has been disclosed in a particular embodiment designed for use in welding applications, it will be appreciated that it could be utilized for other types of applications which require expandable cylindrical fixtures. Thus, for example the principles of the present invention could be utilized in brake mechanisms, in variable speed sheaves, in transmission assemblies and the like.

From the foregoing, it can be seen that there has been provided an improved expandable cylinder mechanism which is of relatively simple and economical construction, which provides a continuous cylindrical surface in the expanded condition while utilizing a minimal number of parts, only selected ones of which are positively driven, and which has a capability for rotating the entire mechanism.

I claim:

1. An expandable structure comprising a hollow tubular frame, a segmented cylinder carried by and encompassing said frame and including a plurality of discrete segment means each having a part-cylindrical outer surface, each of said segment means being movable inwardly and outwardly of said cylinder between an expanded condition wherein said outer surfaces cooperate to form a substantially continuous cylindrical surface and a retracted condition, means cooperating with said frame for inhibiting movement of said segment means axially of said frame, bias means resiliently urging only first ones of said segment means inwardly to the retracted condition thereof, drive means disposed within said frame and movable axially thereof for engagement with only second ones of said segment means to effect movement thereof outwardly to the expanded condition thereof, and means responsive to movement of either of said first or second ones of said segment means for effecting a corresponding movement of the other ones of said segment means.

2. The expandable structure of claim 1, wherein said first ones of said segments alternate respectively with said second ones of said segments.

3. The expandable structure of claim 2, wherein said cylinder includes six segments.

4. The expandable structure of claim 1, wherein said bias means includes a plurality of helical springs.

5. The expandable structure of claim 1, wherein said means responsive to movement includes a plurality of first cam surfaces on said first ones of said segments and a plurality of second cam surfaces on said second ones of said segments, said first cam surfaces being disposed for camming engagement with said second cam surfaces.

6. The expandable structure of claim 5, wherein said first cam surfaces are always in engagement with said second cam surfaces.

7. The expandable structure of claim 1, wherein said cylinder is a right circular cylinder.

8. The expandable structure of claim 7, wherein said cam surfaces lie in planes defining chords of said cylinder.

9. The expandable structure of claim 1, wherein said structure includes a plurality of said segmented cylinders arranged coaxially and spaced apart along said frame.

10. An expandable structure comprising a cylindrical frame member, means extending outwardly from said frame member and cooperating therewith to define a channel extending circumferentially therearound, a segmented cylinder disposed in said channel and including a plurality of discrete segment means each having a part-cylindrical outer surface, each of said segment means being movable inwardly and outwardly relative to said frame member between an expanded condition wherein said outer surfaces cooperate to form a substantially continuous cylindrical surface and a retracted condition, said means defining said channel serving to inhibit movement of said segment means axially of said frame member, bias means resiliently urging only first ones of said segment means inwardly to the retracted condition thereof, drive means disposed within said frame member and movable axially thereof for engagement with only second ones of said segment means to effect movement thereof outwardly to the expanded condition thereof against the urging of said bias means, and means responsive to movement of either of said first or second ones of said segment means for effecting a corresponding movement of the other ones of said segment means.

11. The expandable structure of claim 10, wherein said outwardly extending means cooperates with said frame member to define two axially spaced-apart coaxial channels, said expandable structure including two of said segmented cylinders respectively disposed in said channels.

12. The expandable structure of claim 11, wherein each of said cylinders includes first segments having a first length and second segments having a second length and respectively alternating with said first segments.

13. The expandable structure of claim 12, wherein said bias means operates directly on only the longer ones of said segments, said drive means operating directly on only the shorter ones of said segments.

14. The expandable structure of claim 10, wherein said segmented cylinder is a right circular cylinder.

15. The expandable structure of claim 14, wherein said structure includes two of said cylinders arranged coaxially and spaced apart along said frame member, one of said cylinders being rotatably offset from the other about their common axis.

16. An expandable structure comprising a hollow tubular frame member having apertures therein, a segmented cylinder encompassing said tubular member and including a plurality of discrete segments each having a part-cylindrical outer surface, each of said segments being movable inwardly and outwardly relative to said frame member between an expanded condition wherein said outer surfaces cooperate to form a substantially continuous cylindrical surface and a retracted condition, means cooperating with said frame member for inhibiting movement of said segment means axially of said frame member, bias means cooperating with said frame member for resiliently urging only first ones of said segments inwardly to the retracted condition thereof, cam follower means coupled to only second ones of said segments and extending inwardly therefrom through said apertures in said tubular member, and drive means disposed within said tubular member and movable axially thereof for camming engagement with said cam follower means to move said second ones of said segments outwardly to the expanded condition thereof, and means responsive to movement of either of said first or second ones of said segments for effecting a corresponding movement of the other ones of said segments.

17. The expandable structure of claim 16, wherein said bias means includes a plurality of studs respectively connected to said first ones of said segments and extending inwardly therefrom through corresponding ones of said apertures, each of said studs having an enlarged head at the inner end thereof, and a plurality of helical compression springs respectively surrounding said studs between said heads and said frame member.

18. The expandable structure of claim 17, wherein said second segments respectively alternate with said first segments.

19. The expandable structure of claim 18, wherein said drive means includes a generally cylindrical pusher member having a plurality of slots therein for respectively receiving said studs to accommodate the axial movement of said drive means.

20. The expandable structure of claim 16, wherein said structure includes a plurality of said segmented cylinders spaced apart longitudinally of said frame member.

* * * * *